United States Patent
Mori et al.

(10) Patent No.: US 12,376,524 B1
(45) Date of Patent: Aug. 5, 2025

(54) PRODUCE HARVESTING DEVICE

(71) Applicant: Tokuiten Inc., Nagoya (JP)

(72) Inventors: Hiroki Mori, Nagoya (JP); Shota Nonoyama, Nagoya (JP); Yuta Mizukami, Nagoya (JP); Taro Tako, Nagoya (JP); Rintaro Konno, Nagoya (JP)

(73) Assignee: Tokuiten Inc.

( * ) Notice: Subject to any disclaimer, the term of this patent is extended or adjusted under 35 U.S.C. 154(b) by 0 days.

(21) Appl. No.: 19/043,550

(22) Filed: Feb. 3, 2025

(30) Foreign Application Priority Data

Feb. 6, 2024 (JP) ................................ 2024-016328

(51) Int. Cl.
*A01D 46/30* (2006.01)
*G06T 7/70* (2017.01)
*G06V 20/68* (2022.01)

(52) U.S. Cl.
CPC ............... *A01D 46/30* (2013.01); *G06T 7/70* (2017.01); *G06V 20/68* (2022.01); *G06T 2207/10024* (2013.01); *G06T 2207/30188* (2013.01)

(58) Field of Classification Search
CPC ...... A01D 46/30; A01D 46/247; A01D 46/20; A01D 46/24; A01D 46/005; G06T 7/70; G06V 20/68; B25J 9/0084; B25J 9/046; B25J 5/005; B25J 15/06; B25J 15/0616; B25J 19/023
See application file for complete search history.

(56) References Cited

U.S. PATENT DOCUMENTS

| | | | | |
|---|---|---|---|---|
| 3,460,330 | A | * 8/1969 | Black, Jr. | A01D 46/005 56/328.1 |
| 4,519,193 | A | * 5/1985 | Yoshida | B25J 9/046 348/89 |
| 7,695,220 | B2 | * 4/2010 | Bryan, Jr. | B65G 11/203 406/84 |
| 2021/0045290 | A1 | * 2/2021 | Takemura | B25J 13/081 |

FOREIGN PATENT DOCUMENTS

| | | |
|---|---|---|
| JP | 2010-207118 A | 9/2010 |
| JP | 2021-036821 A | 3/2021 |
| JP | 2021-058936 A | 4/2021 |
| JP | 2021-171020 | 11/2021 |
| JP | 2022-093928 A | 6/2022 |

OTHER PUBLICATIONS

A Giant Tomato Appears on Katsuyama Street! <URL:https://www.kyutech.ac.jp/whatsnew/press/entry-8022.html> (published on Jan. 25, 2021).

* cited by examiner

*Primary Examiner* — Joseph M Rocca
*Assistant Examiner* — Robert E Pezzuto
(74) *Attorney, Agent, or Firm* — Best Mode IP Law, PLLC; Yusuke Hirai

(57) ABSTRACT

A produce harvesting device includes a cylindrical member that defines a guide passage therein through which a fruit or vegetable passes toward a rear side; an annular member that radially extends from an inner circumferential surface of the cylindrical member into the guide passage and defines a through hole that passes through the annular member from a front side to the rear side; a plurality of protrusions that radially protrudes into the guide passage; and a rotation driving unit that drives the plurality of protrusions to rotate about a virtual axis that extends in a direction along the guide passage.

14 Claims, 6 Drawing Sheets

PRODUCE HARVESTING DEVICE

CROSS REFERENCE TO RELATED APPLICATION

This application is based on, and claims the benefit of priority from Japanese Patent Application No.2024-016328 on Feb. 6, 2024. The entire disclosure of the above application is incorporated herein by reference.

TECHNICAL FIELD

The present disclosure relates to a produce harvesting device used to harvest a fruit or vegetable (i.e., produce).

BACKGROUND

Harvesting of various fruits and vegetables, such as tomatoes, is still manually operated. Therefore, it is desirable to present a useful technique for improving the harvesting efficiency of fruits and vegetables.

For example, a produce harvesting end effector described in JP 2010-207118 A has a U-shaped metal fitting and a stalk holder. The end effector takes in a fruit or vegetable by the metal fitting and hooks and tears off the stalk of the fruit or vegetable using the metal fitting while holding the stalk with the stalk holder. Further, a harvesting robot described in JP 2021-036821 A includes a harvesting ring and plucks a fruit or vegetable by twisting and pulling the harvesting ring during the process of pushing up the harvesting ring along the side surface of the fruit or vegetable.

SUMMARY

In one aspect of the present disclosure, a produce harvesting device includes: a cylindrical member that defines a guide passage therein through which a fruit or vegetable passes toward a rear side, the cylindrical member guiding the fruit or vegetable toward a hose that is connected to the cylindrical member and defines a suction passage for air therein in communication with the guide passage; an annular member that radially extends from an inner circumferential surface of the cylindrical member into the guide passage and defines a through hole that passes through the annular member from a front side to the rear side; a plurality of protrusions that radially protrudes into the guide passage, the plurality of protrusions being located in front of the annular member; and a rotation driving unit that is configured to drive the plurality of protrusions to rotate about a virtual axis that extends in a direction along the guide passage. The rotation driving unit is further configured to rotate the plurality of protrusions to radially push the fruit or vegetable inside the guide passage of the cylindrical member. The annular member is further configured to: be deformed toward the rear side to enlarge the through hole when the fruit or vegetable moving toward the rear side comes into contact with the annular member; and reduce the through hole in size by returning back to an original shape of the annular member.

DETAILED DESCRIPTION

Figure 1:
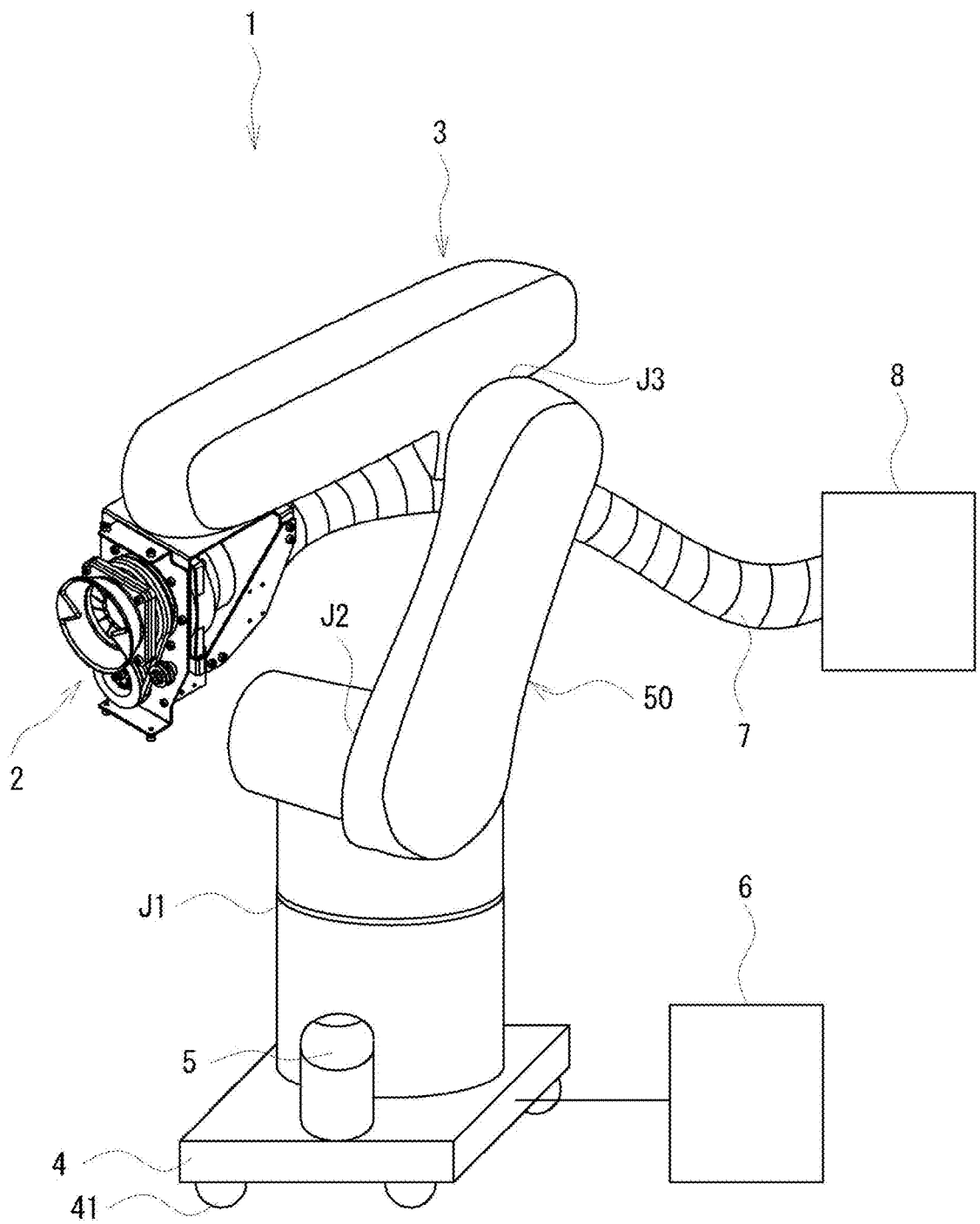
FIG. 1 is a perspective view of a produce harvesting device 1 when viewed diagonally from a right-upper side.

Next, a relevant technology will be described first only for understanding the following embodiment. When a fruit and vegetable is picked by bringing a member into contact with the fruit and vegetable as described in the above-described patent literatures, it is difficult to improve harvesting efficiency. Furthermore, when a fruit or vegetable is picked using a member, the fruit or vegetable is likely to be damaged or deformed.

In view of the above, the inventors of the present disclosure considered that by harvesting fruits or vegetables using a suction force of air, harvesting efficiency would be improved and damages to the fruits or vegetables would be avoided. However, after repeated trials and errors, the inventors in the present disclosure also found that when the suction force of air was low, the fruits or vegetables could not be properly sucked in, which reduced the accuracy of harvesting. On the contrary, if the suction force of air was high, although the harvesting efficiency improved, the fruits or vegetables were damaged or deformed when the fruits or vegetables came into contact with an object in the suction passage. Since fruits and vegetables vary in shape, size, hardness, etc., it is difficult to determine an appropriate suction force. Therefore, there has been a demand for a technology that can efficiently harvest multiple fruits and vegetables, which have differences in shape, size, and hardness, while preventing damage, deformation, or the like to the fruits and vegetables.

A typical objective of the present disclosure is to provide a produce harvesting device that is capable of efficiently harvesting a plurality of types of fruits or vegetables while avoiding an occurrence of damage, deformation, and the like, to the fruits or vegetables.

In an aspect of the present disclosure, a produce harvesting device includes: a cylindrical member that defines a guide passage therein through which a fruit or vegetable passes toward a rear side, the cylindrical member guiding the fruit or vegetable toward a hose that is connected to the cylindrical member and defines a suction passage for air therein in communication with the guide passage; an annular member that radially extends from an inner circumferential surface of the cylindrical member into the guide passage and defines a through hole that passes through the annular member from a front side to the rear side; a plurality of protrusions that radially protrudes into the guide passage, the plurality of protrusions being located in front of the annular member; and a rotation driving unit that is configured to drive the plurality of protrusions to rotate about a virtual axis that extends in a direction along the guide passage. The rotation driving unit is further configured to rotate the plurality of protrusions to radially push the fruit or vegetable inside the guide passage of the cylindrical member. The annular member is further configured to: be deformed toward the rear side to enlarge the through hole when the fruit or vegetable moving toward the rear side comes into contact with the annular member; and reduce the through hole in size by returning back to an original shape of the annular member.

According to the produce harvesting device in the present disclosure, multiple types of fruits and vegetables can be harvested efficiently while minimizing occurrence of damage, deformation, and the like, to the fruits and vegetables.

Overview

As exemplified in the present disclosure, a produce harvesting device includes a cylindrical member, an annular member, a plurality of protrusions, and a rotation driving unit. The cylindrical member has a cylindrical shape. A guide passage is formed inside the cylindrical member to allow a fruit or vegetable to pass through the cylindrical member toward a rear side. the guide passage of the cylindrical member is connected to the hose, which serves as a suction passage for air, so that the cylindrical member guides the fruit or vegetable that has passed through the guide passage to the hose. The annular member radially extends from the inner circumferential surface of the cylindrical member into the guide passage. A through hole is formed inside the annular member to pass through the annular member from a front side to the rear side. A plurality of protrusions radially protrude into the guide passage. The plurality of protrusions are located in front of the annular member. A rotation driving unit is configured to drive the plurality of protrusions to rotate about a virtual axis that extends in a direction along the guide passage. The rotation driving unit radially pushes the fruit or vegetable inside the guide passage of the cylindrical member with the plurality of protrusions by rotating the plurality of protrusions. The annular member is deformed toward the rear side to enlarge the through hole when the fruit or vegetable moving toward the rear side comes into contact with the annular member. The annular member reduces the through hole in size by returning back to an original shape of the annular member.

According to the produce harvesting device in the present disclosure, the fruit or vegetable a portion of which entered the guide passage is pushed toward the inside of the guide passage by the rotating protrusions. Furthermore, when a fruit or vegetable (i.e., produce) does not come into contact with the annular member, the through hole formed inside the annular member is in a reduced-size state, and therefore the suction pressure of air in the through hole is higher as compared to the through hole which is an enlarged state. Therefore, the fruits or vegetables are easily moved inward by the high suction pressure. As a result, many of the fruits and vegetables are taken in (torn off) by the suction force, pass through the through hole toward the rear side, and are guided to the hose. In addition, even if the fruit or vegetable comes into contact with the annular member due to various reasons, the annular member temporarily deforms toward the rear side, and the through hole is enlarged, so that the fruit or vegetable can pass smoothly through the through hole toward the rear side. After the fruit or vegetable has passed through the through hole, the through hole is reduced in size by the restoring force of the annular member, so that the suction pressure at the through hole increases again. Therefore, the produce harvesting device in the present disclosure can efficiently harvest multiple fruits or vegetables while preventing the fruits or vegetables from getting damaged, deformed, and the like. The configuration of the protrusions can be selected appropriately. For example, the protrusions may be fixed to the inner circumferential surface of the cylindrical member at a position in front of the annular member and may radially protrude into the guide passage. The rotation driving unit may rotate the cylindrical member about a virtual axis to rotate the plurality of protrusions provided on the cylindrical member. Moreover, the protrusions may be provided separately from the cylindrical member. In this case, the rotation driving unit may rotate the protrusions separately from the cylindrical member, or may rotate the cylindrical member and the protrusions together.

Each of the plurality of protrusions may have a tilt portion that tilts in a direction opposite to the rotational direction about the virtual axis from an outer circumferential edge of the protrusions toward the inside of the guide passage. In this case, by the protrusion rotating about the virtual axis, a fruit or vegetable that comes into contact with the tilt portion of the protrusion is appropriately pushed toward the center of the guide passage by the tilt portion. Accordingly, the fruits or vegetables can be harvested appropriately.

The shape of the tilt portion is not necessarily limited to a straight line, but may be an arc or partial ring shape, for example. For example, the shape of the protrusion when viewed in a direction along the virtual axis may be a triangle or a semicircle.

Further, it is preferable that the protrusion has a certain degree of rigidity against at least a force in the rotational direction. In this case, when the fruit or vegetable comes into contact with the rotating protrusion, the fruit or vegetable can be pushed to the inside of the guide passage without the protrusion being excessively deformed. For example, the protrusion may be entirely formed to be rigid. Furthermore, the protrusion may be formed to have a rigidity against a force in the rotational direction, but to be deformable toward the rear side. In this case, by the protrusion deforming toward the rear side, the space where the fruit or vegetable can move toward the rear side is enlarged. As a result, it is possible to avoid a situation where the fruit or vegetable is clogged.

The protrusions may be arranged to be rotationally symmetrical about the virtual axis when viewed in a direction along the virtual axis. In this case, a fruit or vegetable can be moved into the guide passage stably even when the fruit or vegetable enters the guide passage at any position. Accordingly, the fruits or vegetables can be harvested appropriately.

In the embodiment as described below, the two protrusions are disposed at positions to be two-fold rotationally symmetric. However, n (n is a natural number of 3 or more) protrusions may be arranged at positions to be n-fold rotational symmetry. In other words, the number of protrusions is not necessarily limited to two. Further, even if the multiple protrusions are not arranged to be rotationally symmetrical, the fruits or vegetables can be moved to the inside of the guide passage by the protrusions. Furthermore, even if a single protrusion is used, the fruit or vegetable can be moved by the single protrusion to the inside of the guide passage.

The produce harvesting device may further include an annular cover member that circumferentially surrounds and covers the protrusions. For example, if the center of the guide passage (e.g., the virtual axis about which the protrusions rotate) is not positioned accurately with respect to the target fruit or vegetable, the fruit or vegetable may be offset from the center of the guide passage. Furthermore, during the process of bringing the cylindrical member or the like closer to the target fruit or vegetable, the position of the fruit or vegetable may be offset from the center of the guide passage. Even in such cases, as long as the fruit or vegetable is placed inside the cover member, the rotating protrusions will appropriately guide the fruit or vegetable toward the center of the guide passage. Accordingly, the fruits or vegetables can be harvested appropriately.

The cover member may rotate together with the protrusions. As one example, a plurality of protrusions may be provided on an inner circumferential surface of the cover member. The rotation driving unit rotates the cover member with the multiple protrusions, thereby rotating the multiple protrusions together.

The cover member may be part of the cylindrical member. For example, the annular member on the front side of the cylindrical member may serve as the cover member. The protrusions may be provided on the inner circumferential surface of the cylindrical member (for example, the inner circumferential surface of the cover member that is a part of the cylindrical member). The rotation driving unit rotates the cylindrical member having the multiple protrusions, thereby rotating the multiple protrusions together.

However, even when the multiple protrusions are rotated without rotating the cover member, a fruit or vegetable inside the cover member can be appropriately harvested by the cover member.

The produce harvesting device may further include an outer circumferential cover that circumferentially covers a rotating member. In this case, branches, leaves, etc. are less likely to come into contact with the rotating member (the rotating cylindrical member in the embodiment described below). This reduces the possibility of unnecessarily damaging branches, leaves, etc., and the possibility of moving the target fruit or vegetable.

The annular member may be made of at least one of silicone and rubber, which have flexibility and shape restoring characteristics. In this case, even if the fruit or vegetable comes into contact with the annular member, the fruit or vegetable is less likely to be damaged or deformed. Furthermore, when the fruit or vegetable goes away from the annular member, the shape of the annular member is properly restored, and the through hole is reduced in size. Accordingly, the fruits or vegetables can be harvested appropriately. However, the annular member may be made of material other than silicon or rubber to have deformability and shape recovery properties. For example, the annular member may be made of urethane or the like.

The annular member is formed with a plurality of notches that extend radially outward from the inner annular edge of the annular member that defines the through hole. In this case, a plurality of movable pieces are arranged annularly around the through hole in the annular member. Therefore, when the fruit or vegetable moving toward the rear side comes into contact with any of the movable pieces, the movable piece deforms toward the rear end, allowing the fruit or vegetable to move appropriately to the rear side. Furthermore, when the fruit or vegetable is separated from the movable pieces, the shape of each movable piece is properly restored and the through hole is reduced in size. Accordingly, the fruits or vegetables can be harvested appropriately.

The produce harvesting device may further include a hose and a speed reducer. As previously described, the hose is connected to the guide passage in the cylindrical member. The speed reducer extends inward from the inner circumferential surface of the hose without blocking or closing the guide passage in the hose. The speed reducer comes into contact with the fruit or vegetable passing through the hose, thereby reducing the passing speed of the fruit or vegetable through the hose. In this case, the speed at which the fruit or vegetable passes through the hose is reduced by the speed reducer, so that the possibility of damage, deformation, etc. occurring to the fruit or vegetable passing through the hose can be appropriately reduced. Furthermore, since the speed reducer does not block the guide passage within the hose, the speed reducer also prevents the suction pressure of air in the cylinder portion from being reduced. Accordingly, the fruits or vegetables can be harvested appropriately.

A suction pressure generator for generating a suction pressure of air may be disposed in the hose at a position different from the end portion of the hose that is connected to the cylindrical member. In this case, the fruits and vegetables are properly harvested by the suction pressure generated by the suction pressure generator.

The speed reducer may be made of flexible material (for example, at least one of silicon, rubber, urethane, etc.). In this case, even if the fruit or vegetable comes into contact with the speed reducer, the fruit or vegetable is less likely to be damaged or deformed. Furthermore, the specific structure and number of the speed reducers can be appropriately selected. For example, the speed reducer may have a substantially annular shape extending inward from the inner circumferential surface of the hose. A through hole may be defined by the speed reducer. A plurality of movable pieces may be circumferentially arranged around the through hole in the speed reducer. Furthermore, a space may be formed between the adjacent movable pieces. In this case, although the speed reducer is provided, the suction pressure is less likely to increase. Therefore, the speed reducer can reduce the passing speed of the fruits or vegetables by the movable pieces while preventing the passing speed of the fruits or vegetables from increasing due to the suction pressure.

The specific method for providing the speed reducer in the hose may also be selected as appropriate. For example, a plurality of speed reduces may be disposed at connecting portions between a plurality of hoses. In this case, the plurality of speed reducers can be easily and appropriately disposed at the connecting portions between the plurality of hoses.

The produce harvesting device may further include a robot arm, an imaging unit, and a control unit. The robot arm includes an arm member. The robot arm holds a harvesting mechanism by the arm member. The harvesting mechanism includes at least the cylindrical member, the annular member, and the plurality of protrusions. The robot arm moves the harvesting mechanism held by the arm member by driving the arm member. The imaging unit captures images. The control unit may recognize the position of the target fruit or vegetable based on the image captured by the imaging unit, and move the harvesting mechanism to the position of the recognized target fruit and vegetable by controlling the robot arm based on the recognized position of the target fruit and vegetable. Therefore, even if the worker does not move the position of the harvesting mechanism himself/herself, the harvesting mechanism automatically moves to the position of the target fruit or vegetable. Therefore, fruits and vegetables can be harvested while avoiding in increasing the burden on the worker. The location where the imaging unit is installed is not particularly limited as long as the target fruits or vegetables can be captured by the imaging unit. For example, the imaging unit may be installed near the position where the robot arm is held, or may be installed near the harvesting mechanism.

The location where the imaging unit is installed is not particularly limited as long as the target fruits or vegetables can be captured by the imaging unit. For example, the imaging unit may be installed near the position where the robot arm is held, or may be installed near the harvesting mechanism.

The imaging unit may include a three-dimensional camera capable of measuring the distance to an object. In this case, the control unit can easily and appropriately recognize the position of the target fruit and vegetable based on the distance measured by the three-dimensional camera. Accordingly, the fruits or vegetables can be harvested appropriately.

The imaging unit may be capable of capturing color images. Based on the color images captured by the imaging unit, the control unit may identify the target fruit or vegetable from among one or more fruits or vegetables in the color image. In this case, even if a plurality of fruits or vegetables are captured in a color image, the target fruit or vegetable can be appropriately identified based on the color image. Accordingly, the fruits or vegetables can be harvested appropriately. However, it is also possible to identify the target fruit or vegetable based on monochrome images or the like.

A specific method for identifying the target fruit or vegetable based on the images can be selected as appropriate. For example, a mathematical model trained by a machine learning algorithm may be used to output the identified target fruit or vegetable by inputting the image into the mathematical model. The control unit may acquire the identified result output by the mathematical model by inputting the image captured by the imaging unit into the mathematical model. In this case, the target fruit or vegetable can be identified with higher accuracy.

In the present disclosure, the robot arm moves the harvesting mechanism to a position around the fruit or vegetable. However, the configuration for moving the harvesting mechanism can also be changed. For example, a worker himself may move the harvesting mechanism to a position close to the fruit or vegetable. In other words, the harvesting mechanism and the like excluding the robot arm may be used as a produce harvesting device. Even in this case, the fruits or vegetables can be properly harvested using the harvesting mechanism described in the present disclosure.

In addition, other configurations may be added to the harvesting mechanism exemplified in this disclosure to harvest fruits or vegetables. For example, a structure (such as a cutter) for plucking fruits or vegetables from the branches may be disposed near the protrusions. In this case, even fruits and vegetables that are difficult to pluck from the branches can be more easily harvested properly using the cutter.

EMBODIMENT (General Configuration)

Hereinafter, a typical embodiment of the present disclosure will be described with reference to the drawings. With reference to FIG. 1, an example of the configuration of a produce harvesting device 1 according to the present embodiment will be schematically described. As an example, the produce harvesting device 1 in the present embodiment is used to harvest a plurality of tomatoes (e.g., cherry tomatoes, etc.) as produce. However, at least a portion of the techniques illustrated in this disclosure may also be applied to produce harvesting devices that harvest produce (such as fruits, crops, vegetables, and other agricultural products) other than tomatoes.

As shown in FIG. 1, the produce harvesting device 1 in the present embodiment includes a harvesting mechanism 2, a robot arm 3, a base 4, an imaging unit 5, a control unit 6, a hose 7, and a suction pressure generator 8. The harvesting mechanism 2 is disposed close to fruits or vegetables, which are harvesting targets, to take in the fruits and vegetables into an internal guide passage of the harvesting mechanism 2, plucks them off, and guides them to the hose 7. The robot arm 3 holds and moves the harvesting mechanism 2. The base 4 supports the robot arm 3. The imaging unit 5 captures images. As an example, in this embodiment, the imaging unit 5 is disposed at a predetermined position on the base 4. However, the position of the imaging unit 5 can be changed as appropriate. For example, the imaging unit 5 may be disposed on a base portion 9 of the harvesting mechanism 2 as described later. The control unit 6 controls the produce harvesting device 1. The hose 7 serves as a path for moving fruits or vegetables introduced from the harvesting mechanism 2 to a harvest accumulation location. The suction pressure generator 8 is connected to the hose 7 and generates a suction pressure in the hose 7 by making the air pressure within the hose 7 negative. In other words, the hose 7 also functions as a suction path through which air is sucked by the suction pressure generator 8. The details of each element will be described below.

(Harvesting Mechanism)

Figure 2:
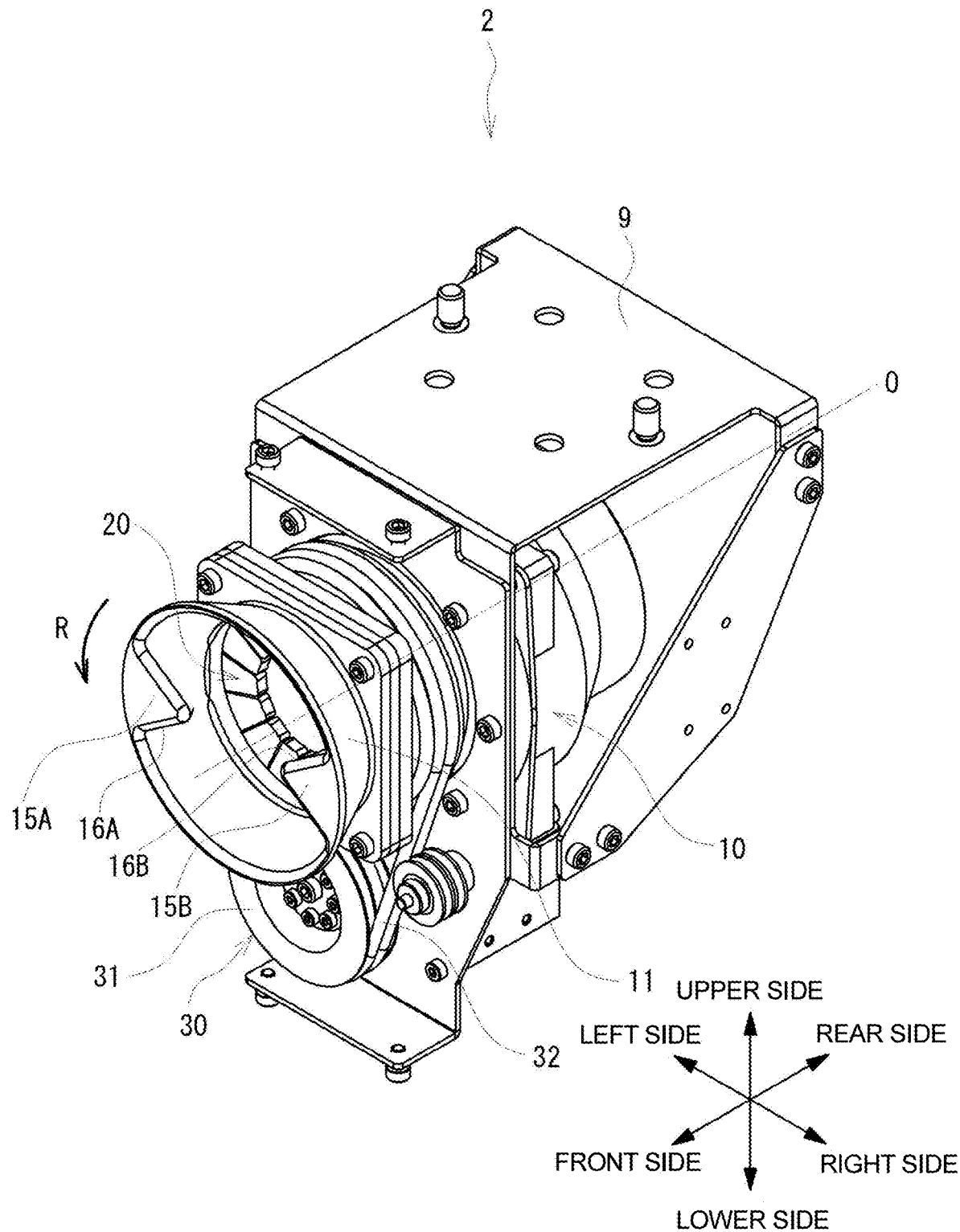
FIG. 2 is a perspective view of a harvesting mechanism 2 when viewed from diagonally from a right-upper side.

The harvesting mechanism 2 in this embodiment will be described with reference to FIGS. 2 to 5. In FIG. 2, the upper side of the paper refers to an upper side of the harvesting mechanism 2, the lower side refers to a lower side of the harvesting mechanism 2, the lower left side refers to a front side (a tip side) of the harvesting mechanism 2, the upper right side refers to a rear side (a rear end side) of the harvesting mechanism 2, the upper left side refers to a left side of the harvesting mechanism 2, and the lower right side refers to a right side of the harvesting mechanism. Accordingly, in the front view illustrated in FIG. 3, the upper side of the paper is the upper side of the harvesting mechanism 2, the lower side is the lower side of the harvesting mechanism 2, the left side is the left side of the harvesting mechanism 2, and the right side is the right side of the harvesting mechanism 2. In addition, in the cross-sectional view illustrated in FIG. 4, the upper side of the paper is the upper side of the harvesting mechanism 2, the lower side of the paper is the lower side of the harvesting mechanism 2, the left side of the paper is the front side (the tip side) of the harvesting mechanism 2, and the right side of the paper is the rear side (the rear end side) of the harvesting mechanism 2.

Figure 3:
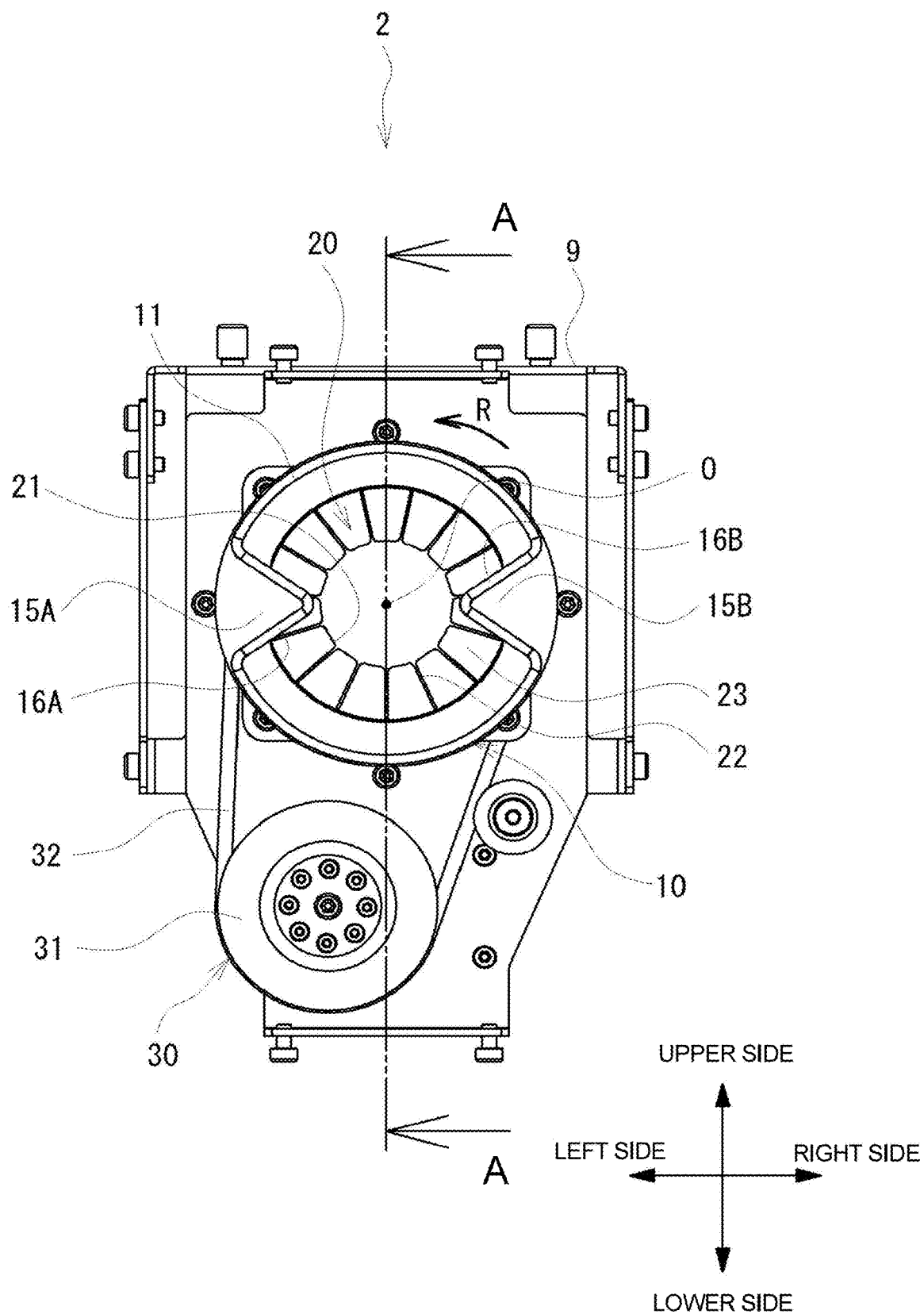
FIG. 3 is a front view of the harvesting mechanism 2 (as viewed in a direction along a virtual axis).
Figure 4:
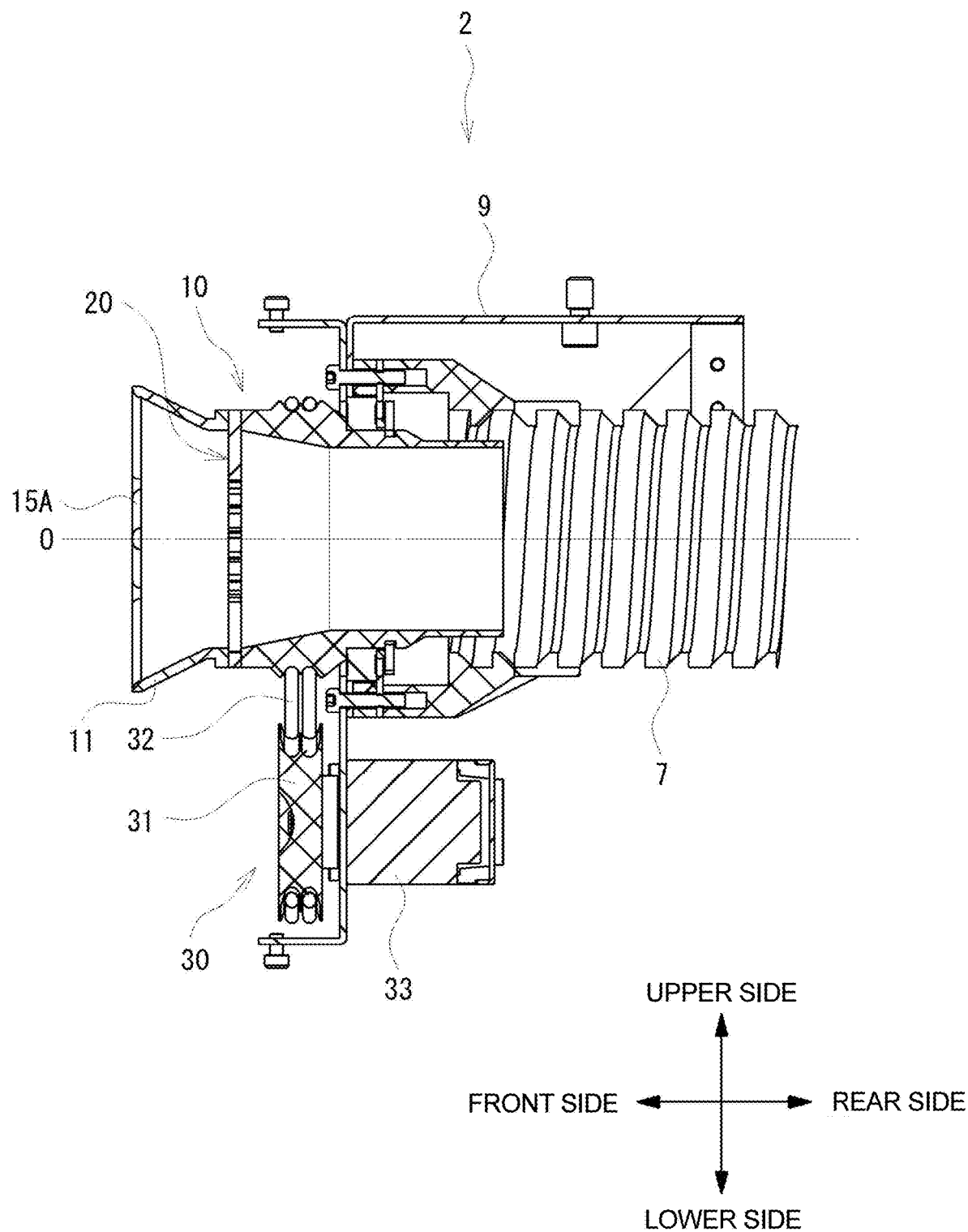
FIG. 4 is a cross-sectional view taken by the A-A line in FIG. 3.

As shown in FIGS. 2 to 4, the harvesting mechanism 2 of the produce harvesting device 1 in the present embodiment includes the base portion 9, a cylindrical member 10, an annular member 20, a plurality of protrusions 15 (15A, 15B), and a rotation drive portion 30. The base portion 9 holds the cylindrical member 10, the annular member 20, the protrusions 15, and the rotation drive portion 30. In this embodiment, the base portion 9 is attached to an arm member 50 (see FIG. 1) of the robot arm 3, and the harvesting mechanism 2 is held by the arm member 50.

The cylindrical member 10 has a cylindrical shape. As an example, the cylindrical member 10 in this embodiment is formed in a substantially cylindrical shape. A guide passage is formed inside the cylindrical member 10 to allow the fruits or vegetables to pass through the cylindrical member 10 from the front side to the rear side. As shown in FIG. 4, the guide passage inside the cylindrical member 10 is connected to one end of the hose 7 which serves as an air suction passage. As a result, the fruits or vegetables that have passed through the guide passage inside the cylindrical member 10 are guided to the hose 7.

The annular member 20 extends from the inner circumferential surface of the cylindrical member 10 toward the inside of the guide passage. In other words, the annular member 20 extends from the inner circumferential surface of the cylindrical member 10 in a direction toward a virtual axis O (see FIGS. 2 and 4), which will be described later. As shown in FIG. 3, a through hole 21 is defined by the annular member 20 that passes through the annular member 20 from the front side to the rear side. The annular member 20 can deform (or be bent) toward the rear side when a fruit or vegetable moving toward the rear side along the guide passage in the cylindrical member 10 comes into contact with the annular member 20. When the annular member 20 is deformed toward the rear side, the size of the through hole 21 is enlarged. Furthermore, when the fruit or vegetable that has come into contact with the annular member 20 moves away from the annular member 20, the shape of the annular member 20 returns back to its original shape. When the shape of the annular member 20 is restored, the size of the through-hole 21 is decreased to have the original size before the fruit or vegetable comes into contact with the annular member 20.

As described above, when a fruit or vegetable (i.e., produce) does not come into contact with the annular member 20, the through hole 21 defined by the annular member 20 is in a downsized state, and therefore the suction pressure of air in the through hole 21 is higher as compared to the enlarged through hole 21. Therefore, the fruits or vegetables easily move inside by the high suction pressure at the through hole 21. As a result, many of the fruits or vegetables are taken in (torn off) by the suction force, pass through the through hole 21 toward the rear side, and are guided to the hose 7. In addition, even if the fruit or vegetable comes into contact with the annular member 20 due to various reasons, the annular member 20 temporarily deforms toward the rear side and the through hole 21 is enlarged, so that the fruit or vegetable can pass smoothly through the through hole 21 toward the rear side. After the fruit or vegetable has passed through the through hole 21, the through hole 21 is reduced in size by the restoring force of the annular member 20, so that the suction pressure at the through hole 21 increases again. This makes it easier for multiple fruits or vegetables to be harvested properly.

The annular member 20 in the present embodiment is made of at least one of silicone and rubber, which have flexibility and shape restoring characteristics. Therefore, even if the fruit or vegetable comes into contact with the annular member 20, the fruit or vegetable is less likely to be damaged or deformed. Furthermore, when the fruit or vegetable goes away from the annular member 20, the shape of the annular member 20 is properly restored, and the through hole 21 is reduced in size again. Accordingly, the fruits or vegetables can be harvested appropriately. In this embodiment, the annular member 20 is made of silicon. Even if silicon is taken into the human body, the silicon is less likely to have any adverse effects on the body. Therefore, the safety of the harvested fruits or vegetables can be more easily guaranteed.

Figure 5:
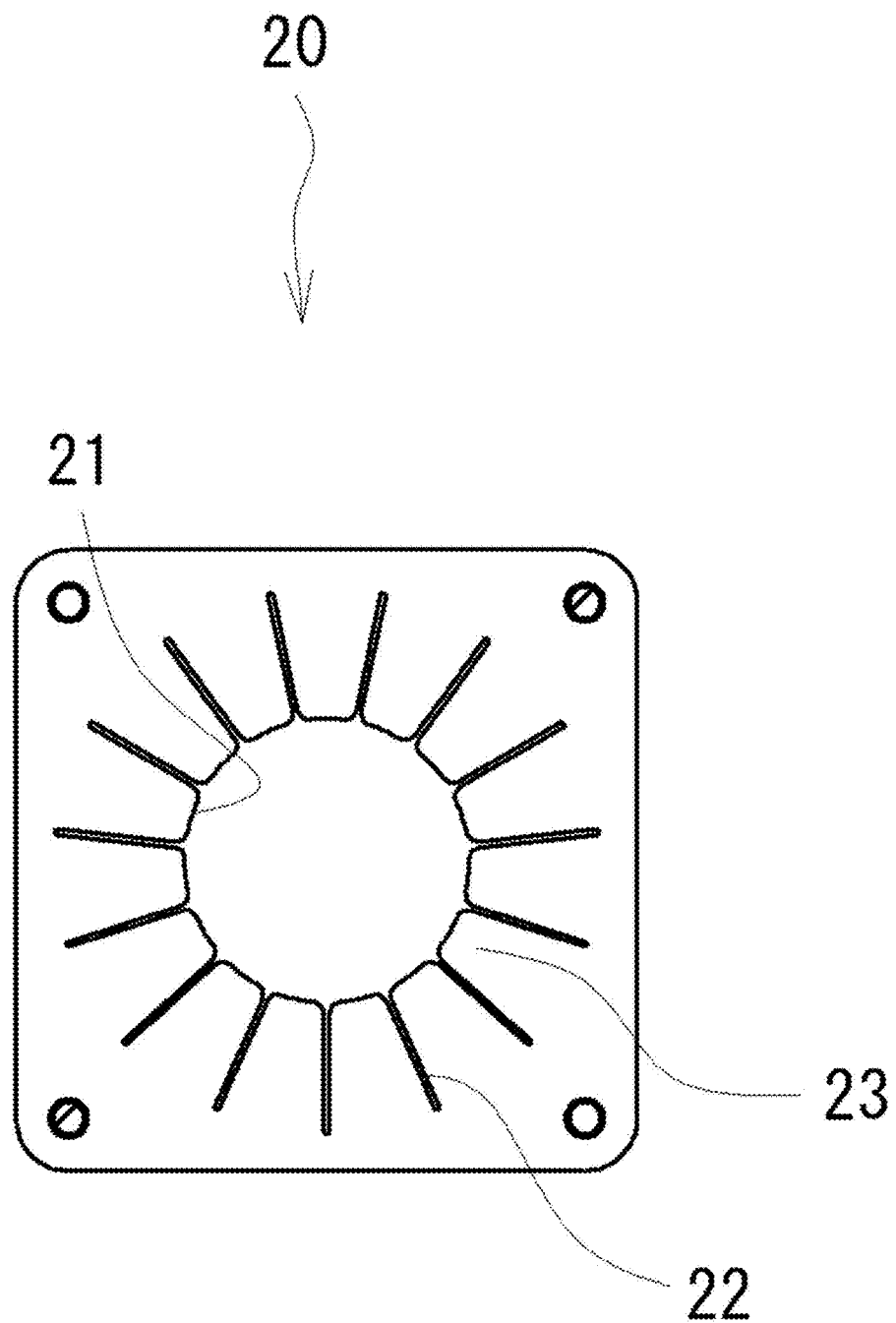
FIG. 5 is a front view of an annular member 20 (as viewed in a direction along the virtual axis).

FIG. 5 is a view (a front view) of the annular member 20 in this embodiment when viewed from the tip side. As shown in FIG. 5, the annular member 20 in this embodiment is formed with a plurality of notches 22 that are radially cut from the inner circumferential edge of the annular member 20 that defines the through hole 21. As a result, a plurality of movable pieces 23 are arranged annularly around the through hole 21 in the annular member 20. The movable piece 23 has flexibility and shape restoring characteristics. When a fruit or vegetable moving toward the rear side along the guide passage in the cylindrical member 10 comes into contact with the movable pieces 23, the movable pieces 23 appropriately deform (or are bent) toward the rear side, and the through hole 21 is enlarged. Therefore, the fruit or vegetable can pass through toward the rear side appropriately. Since the movable pieces 23 are flexible, even if the fruit or vegetable comes into contact with the movable pieces 23, the fruit or vegetable is less likely to be damaged or deformed by the movable pieces 23. Furthermore, when the fruit or vegetable is separated from the movable pieces 23, the shape of each movable piece 23 is properly restored and the size of the through hole 21 is reduced again. Accordingly, the fruits or vegetables can be harvested appropriately.

As shown in FIGS. 2 to 4, the multiple protrusions 15 (in this embodiment, two protrusions 15A and 15B) are formed in the harvesting mechanism 2 at positions closer to the tip side than the position of the annular member 20 (i.e., the protrusions 15 are located in front of the annular member 20). The multiple protrusions 15 protrude toward the center of the guide passage in the cylindrical member 10 (in a direction toward the virtual axis O described later). The rotation driving unit 30 rotates the plurality of protrusions 15 about the virtual axis O (see FIGS. 2 and 3) extending in a direction along the guide passage. In this embodiment, the center axis of the cylindrical member 10 is aligned with the virtual axis O. The rotation driving unit 30 rotates the multiple protrusions 15 to bring them into contact with a fruit or vegetable, thereby moving the fruit or vegetable to the inside of the rotation path of the tube unit 10.

In other words, a fruit or vegetable a portion of which enters the cylindrical member 10 is pushed by the rotating protrusions 15 to move toward the center of the guide passage (in the present embodiment, toward the virtual axis O). Additionally, the inner side of the guide passage is closer to the through hole 21 of the annular member 20 than the outer side of the guide passage. As described above, the suction pressure of air around the through hole 21 of the annular member 20 is higher than other area. Therefore, the fruit or vegetable effectively moves toward the center of the guide passage by the high suction pressure and passes through the through hole 21 toward the rear side. Furthermore, as described above, even if the fruit or vegetable comes into contact with the annular member 20, the fruit or vegetable passes smoothly through the through hole 21 toward the rear side. Therefore, the harvesting mechanism 2 in the present embodiment can efficiently harvest multiple fruits or vegetables while preventing the fruits or vegetables from getting damaged, deformed, and the like.

As shown in FIGS. 2 and 3, each of the multiple protrusions 15 has an edge portion (a tilt portion 16) on an advance side of the protrusion in the rotational direction about the virtual axis O (i.e., the direction of arrow R in FIGS. 2 and 3). The tilt portion 16 of each protrusion tilts in a direction opposite to the rotational direction of the protrusion 15 from the outer circumferential edge of an annular cover member 11 (will be described later) toward the center of the guide passage of the cylindrical member 10 (toward the virtual axis O). In other words, the tilt portion 16 tilts toward a retard side in the rotational direction from the outer end to the inner end of the tilt portion 16. In this embodiment, the protrusion 15A has the tilt portion 16A, and the protrusion 15B has the tilt portion 16B. Therefore, by the protrusion 15 rotating about the virtual axis O, the fruit or vegetable that comes into contact with the tilt portion 16 of each protrusion 15 is appropriately pushed toward the center of the guide passage by the tilt portion 16. As a result, the fruit or vegetable can pass through the through hole 21 of the annular member 20 appropriately.

In this embodiment, the shape of the protrusion 15 when viewed in a direction along the virtual axis O is a triangle. However, the shape of the protrusion 15 is not necessarily limited to a triangular shape, and may have a semicircular shape or the like. In other words, the shape of the tilt portion 16 is not necessarily limited to a straight line, but may be an arc (i.e., curved) or partial ring shape, for example.

The protrusion 15 has a certain degree of rigidity against a force applied in the rotational direction. Therefore, even if the fruit or vegetable comes into contact with the rotating protrusion 15, the protrusion 15 is not excessively deformed, and the fruit or vegetable can be moved to the inside of the guide passage. As an example, the entire protrusion 15 in this embodiment has rigidity. However, the configuration of the protrusion 15 may be changed. For example, the protrusion 15 may be configured not to deform when receiving a force in the rotational direction, but to be deformable toward the rear side. In this case, by the protrusion 15 deforming toward the rear side, the space where the fruit or vegetable can move toward the rear side is expanded.

As shown in FIG. 3, the multiple protrusions 15 in this embodiment are arranged symmetrically about the virtual axis O when viewed in a direction along the virtual axis O (i.e., a front direction). Therefore, even when a fruit or vegetable enters the guide passage in the cylindrical member 10 from any position, the multiple protrusions 15 arranged in symmetry cause the fruit or vegetable to move stably to the inside of the guide passage. Accordingly, the fruits or vegetables can be harvested appropriately. In this embodiment, the two protrusions 15 are arranged to be two-fold rotationally symmetric. However, n (n is a natural number of 3 or more) protrusions 15 may be arranged at positions to be n-fold rotationally symmetric. In other words, the number of protrusions 15 is not necessarily limited to two.

As shown in FIGS. 2 to 4, the harvesting mechanism 2 in this embodiment includes the annular cover member 11 that surrounds and covers the protrusions 15. As a result, even if the position of the fruit or vegetable is offset relative to the virtual axis O, as long as the fruit or vegetable is positioned inside the cover member 11, the rotating protrusion 15 pushes the fruit or vegetable appropriately toward the inside of the guide passage.

In this embodiment, the cover member 11 forms a part of the cylindrical member 10. In detail, in this embodiment, the annular member on the front side of the cylindrical member 10 serves as the cover member 11. The multiple protrusions are provided on the inner circumferential surface of the cylindrical member 10 (in this embodiment, the inner circumferential surface of the cover member 11 which is a part of the cylindrical member 10). The cylindrical member 10 is rotatably held by the base portion 9. The rotation driving unit 30 drives the cylindrical member 10 (i.e., the cover member 11) having the multiple protrusions 15 to rotate, thereby rotating the multiple protrusions 15.

Although not shown in the drawings, the harvesting mechanism 2 in this embodiment includes an outer circumferential cover that covers the cylindrical member 10 in a circumferential direction, which is a rotating member. This reduces the possibility that branches, leaves, etc. will come into contact with the rotating cylindrical member 10 and be damaged and the possibility that fruits or vegetables move together with the cylindrical member 10.

As shown in FIGS. 2 to 4, the rotation driving unit 30 in this embodiment includes a pulley 31, a belt 32, and a motor 33 (see FIG. 4). The pulley 31 is held to be rotatable about an axis parallel to the virtual axis O which is the center of rotation of the protrusions 15. The motor 33 rotates the pulley 31. The belt 32 is stretched between the pulley 31 and the cylindrical member 10. Therefore, when the pulley 31 is rotated by the driving force of the motor 33, the rotational force of the pulley 31 is transmitted to the cylindrical member 10 via the belt 32, and the cylindrical member 10 rotates about the virtual axis O. As a result, the multiple protrusions 15 on the cylindrical member 10 also rotate about the virtual axis O. However, the configuration for rotating the multiple protrusions 15 may be changed. For example, a gear or the like may be used instead of the pulley 31 and the belt 32 so that the driving force of the motor 33 can be transmitted to the protrusions 15. Furthermore, the protrusions 15 may be formed separately from the cylindrical member 10. In this case, the rotation driving unit 30 needs to have a mechanism for rotating at least the protrusions 15.

(Hose)

The configuration of the hose 7 in this embodiment will be described with reference to FIG. 6. The hose 7 in this embodiment is flexible. Therefore, even if the harvesting mechanism 2 to which the tip of the hose 7 is connected is displaced, the tip of the hose 7 follows the movement of the harvesting mechanism 2. Therefore, the fruits or vegetables taken in by the harvesting mechanism 2 are properly harvested through the hose 7.

Figure 6:
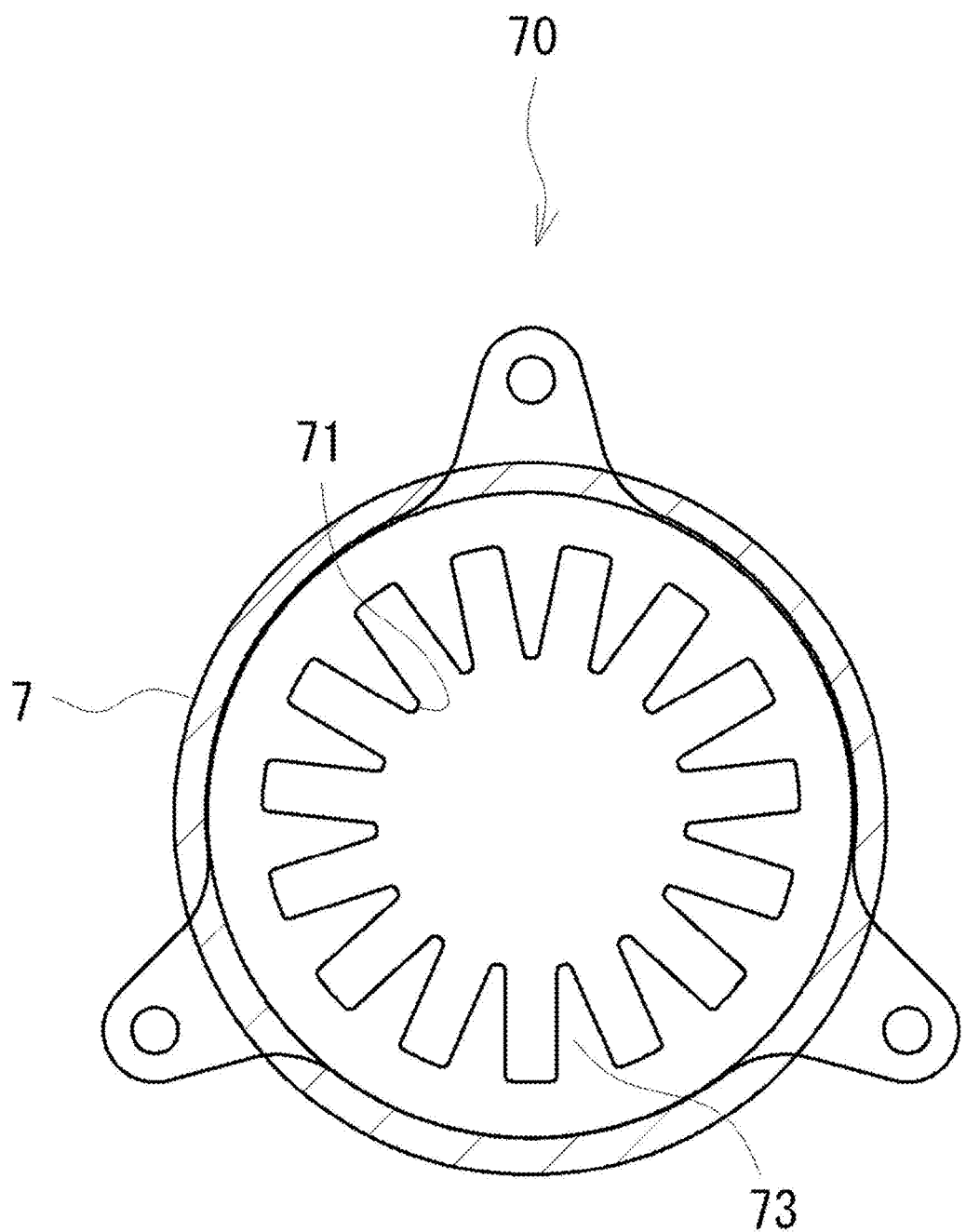
FIG. 6 is a cross-sectional view of a hose 7 taken along a cross-section intersecting a passage of the hose.

As shown in FIG. 6, a speed reducer 70 is provided inside the hose 7 in this embodiment. The speed reducer 70 extends inward from the inner circumferential surface of the hose 7 without blocking or closing the path in the hose 7. The speed reducer 70 comes into contact with the fruit or vegetable passing through the hose 7, thereby reducing the passing speed of the fruit or vegetable through the hose 7. As a result, the possibility of damage, deformation, etc. occurring to the fruits or vegetables passing through the hose 7 can be reduced. Furthermore, since the speed reducer 70 does not block the path within the hose 7, the speed reducer 70 also prevents the suction pressure of air in the cylindrical member 10 from being reduced. Accordingly, the fruits or vegetables can be harvested appropriately.

The speed reducer 70 in this embodiment is made of flexible material (e.g., silicon in this embodiment). Therefore, even if the fruit or vegetable comes into contact with the speed reducer 70, the fruit or vegetable is less likely to be damaged or deformed. Furthermore, even if silicon is taken into the human body, the silicon is less likely to have any adverse effects on the body. Therefore, the safety of the harvested fruits or vegetables can be more easily guaranteed.

As shown in FIG. 6, the speed reducer 70 in the present embodiment has a substantially annular shape extending inward from the inner circumferential surface of the hose 7. Since a through hole 71 is defined by the speed reducer 70, the path inside the hose 7 is not blocked or closed by the speed reducer 70. A plurality of movable pieces 73 are circumferentially arranged around the through hole 71 in the speed reducer 70. Therefore, the speed of the fruits or vegetables passing through the hose 7 is appropriately reduced by the movable pieces 73, and the movable pieces 73 are less likely to cause damage to the fruits or vegetables. Furthermore, a space is formed between the radially adjacent movable pieces 73. Therefore, although the speed reducer 70 is provided, the suction pressure at the through hole 71 is less likely to increase. Therefore, an increase in the passing speed of the fruits or vegetables around the through holes 71 can be suppressed.

(Robot Arm)

One example of the robot arm 3 will be described with reference to FIG. 1. As described above, the robot arm 3 holds and moves the harvesting mechanism 2. As an example, the robot arm 3 in this embodiment includes an arm member 50 having a plurality of joints J1 to J3. The harvesting mechanism 2 is held by the arm member 50. The robot arm 3 can move the harvesting mechanism 2 held by the arm member 50 by operating the arm member 50 via the joints J1 to J3. However, it is also possible to use an arm member that is driven by a mechanism other than the joints.

The arm member 50 is fixed to the base 4. The base 4 is provided with an arm moving unit 41 that moves the arm member 50 in a direction parallel to the installation surface of the base 4 on which the arm member 50 is installed. When the arm moving unit 41 is driven, the entire arm member 50 moves on the installation surface. The configuration of the arm moving unit 41 can be selected appropriately. For example, the arm moving unit 41 may include wheels and a motor for rotating the wheels. Also, a belt conveyor or the like may serve as the arm moving unit.

(Control Unit)

The control unit 6 controls the produce harvesting device 1. As an example, the control unit 6 in this embodiment is a personal computer (hereinafter, referred to as a "PC"). However, a device other than a PC (for example, at least one of a server, a tablet terminal, a smartphone, etc.) may be used as the control unit 6. In addition, control units of a plurality of devices may cooperate to serve as the control unit that controls the produce harvesting device 1.

The control unit 6 includes a CPU (controller) that performs various control processes, and a storage device (NVM). The control unit 6 is connected to the robot arm 3 and the imaging unit 5, etc. via at least one of wired communication, wireless communication, a network, etc. The control unit 6 is also connected to an operation unit and a display unit. The operation unit is operated by an operator (such as a user or a worker) to input various instructions. The operation unit may be, for example, at least one of a keyboard, a mouse, a touch panel, and the like. The display unit displays various images. In addition, an operation unit and a display unit integrally provided in the control unit may be used instead of using the operation unit and the display unit externally connected to the control unit 6.

The control unit 6 recognizes the position of a fruit or vegetable as a harvesting target based on images captured by the imaging unit 5. The control unit 6 controls the driving of the robot arm 3 based on the recognized position of the target fruit or vegetable, thereby moving the harvesting mechanism 2 to the recognized position of the target fruit or vegetable. That is, since the harvesting mechanism 2 automatically moves to the position of the target fruit or vegetable, the worker does not need to move the position of the harvesting mechanism 2 himself/herself. Therefore, fruits or vegetables can be harvested while avoiding in increasing the burden on the worker.

The imaging unit 5 in this embodiment is a three-dimensional camera capable of measuring the distance to an object. The control unit 6 acquires the distance between a fruit or vegetable as a harvesting target and the three-dimensional camera, which is measured by the three-dimensional camera. The control unit 6 can appropriately recognize the position of the target fruit or vegetable based on the acquired distance.

Moreover, the imaging unit 5 in this embodiment may capture color images. Based on the color images captured by the imaging unit 5, the control unit 6 identifies the target fruit or vegetable from among one or more fruits or vegetables appearing in the color image. Therefore, even if a plurality of fruits or vegetables are captured in a color image, the target fruit or vegetable can be appropriately identified based on the color image.

In this embodiment, a mathematical model may be used. The mathematical model has been trained by a machine learning algorithm to output an identified result of the target fruit or vegetable when an image (in the present embodiment, a color image) is input into the mathematical model. For example, the mathematical model is trained to output an identified fruit or vegetable as a harvesting target from among one or more of fruits or vegetables appearing in the color image. The control unit 6 acquires the identified result output by the mathematical model by inputting the image captured by the imaging unit 5 into the mathematical model. Therefore, the target fruit or vegetable can be identified with higher accuracy.

The technology disclosed in the above embodiments is only one example. Therefore, the techniques illustrated in the above embodiments can be modified. For example, it is possible to implement only a part of the techniques exemplified in the above embodiments. Specifically, in the above embodiment, the robot arm 3 moves the harvesting mechanism 2 to a position around the fruit or vegetable. However, the configuration for moving the harvesting mechanism 2 can also be changed. For example, the worker himself may move the harvesting mechanism 2 to a position close to the fruit or vegetable. In other words, the harvesting mechanism 2 and the like excluding the robot arm 3 may be used as a produce harvesting device. In addition, it is also possible to use other configurations in addition to at least a part of the configurations exemplified in the above embodiments.

The invention claimed is:

1. A produce harvesting device, comprising:
   a cylindrical member that defines a guide passage therein through which a fruit or vegetable passes toward a rear side, the cylindrical member guiding the fruit or vegetable toward a hose that is connected to the cylindrical member and defines a suction passage for air therein in communication with the guide passage;
   an annular member that radially extends from an inner circumferential surface of the cylindrical member into the guide passage and defines a through hole that passes through the annular member from a front side to the rear side;
   a plurality of protrusions that radially protrudes into the guide passage, the plurality of protrusions being located in front of the annular member; and
   a rotation driving unit that is configured to drive the plurality of protrusions to coaxially revolve around a single virtual axis that extends in a direction along the guide passage, wherein
   the rotation driving unit is further configured to rotate the plurality of protrusions to radially guide the fruit or vegetable toward the single virtual axis of the guide passage of the cylindrical member, and
   the annular member is further configured to:
     be deformed toward the rear side to enlarge the through hole when the fruit or vegetable moving toward the rear side comes into contact with the annular member; and
     reduce the through hole in size by returning back to an original shape of the annular member.

2. The produce harvesting device according to claim 1, wherein each of the plurality of protrusions has a tilt portion that tilts toward an inside of the guide passage in a direction opposite to a rotational direction about the single virtual axis.

3. The produce harvesting device according to claim 1, wherein the plurality of protrusions are arranged to be rotationally symmetrical about the single virtual axis when viewed in a direction along the single virtual axis.

4. The produce harvesting device according to claim 1, further comprising a cover member that is configured to surround and cover the plurality of protrusions.

5. The produce harvesting device according to claim 1, wherein the annular member is made of at least one of silicone and rubber having flexibility and shape restoring characteristics.

6. The produce harvesting device according to claim 1, wherein a plurality of notches are formed in the annular member by radially cutting the annular member from an inner edge of the annular member that defines the through hole.

7. The produce harvesting device according to claim 1, further comprising:
a speed reducer that radially extends from an inner circumferential surface of the hose without closing the hose, wherein
the speed reducer is configured to reduce a passing speed of the fruit or vegetable in the hose when the fruit or vegetable passing through the hose comes into contact with the speed reducer.

8. The produce harvesting device according to claim 1, further comprising:
a robot arm that has an arm member holding a harvesting mechanism including the cylindrical member, the annular member, and the plurality of protrusions, the robot arm moving the arm member together with the harvesting mechanism;
an imaging unit that is configured to capture an image; and
a control unit that is configured to control the produce harvesting device, wherein
the control unit is further configured to:
recognize a position of a target fruit or vegetable based on the image captured by the imaging unit; and
move the harvesting mechanism to the position of the recognized target fruit or vegetable by controlling the robot arm based on the position of the recognized target fruit or vegetable.

9. The produce harvesting device according to claim 8, wherein the imaging unit includes a three-dimensional camera that is configured to measure a distance to an object.

10. The produce harvesting device according to claim 8, wherein
the imaging unit is configured to capture a color image, and
the control unit is further configured to identify the target fruit or vegetable from among one or more fruits or vegetables appearing in the color image based on the color image captured by the imaging unit.

11. The produce harvesting device according to claim 1, wherein the single virtual axis aligns with a center of the guide passage.

12. The produce harvesting device according to claim 1, wherein the hose is connected between the cylindrical member and a suction pressure generator.

13. The produce harvesting device according to claim 1, wherein the cylindrical member includes an annular cover having a truncated cone shape.

14. The produce harvesting device according to claim 13, wherein the annular cover has a first opening and a second opening wider than the first opening, and the first opening coupled to the annular member.

* * * * *